(12) United States Patent
Okuno et al.

(10) Patent No.: US 6,937,397 B2
(45) Date of Patent: Aug. 30, 2005

(54) DIFFRACTIVE OPTICAL ELEMENT AND OPTICAL SYSTEM HAVING THE SAME

(75) Inventors: Takeharu Okuno, Utsunomiya (JP); Hideki Ogawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/947,498

(22) Filed: Sep. 7, 2001

(65) Prior Publication Data

US 2002/0105726 A1 Aug. 8, 2002

(30) Foreign Application Priority Data

Sep. 8, 2000 (JP) .................................... 2000-273339

(51) Int. Cl.[7] .................................................. G02B 5/18
(52) U.S. Cl. ........................ 359/575; 359/569; 359/576
(58) Field of Search .................................. 359/569, 566, 359/558, 570, 571, 574, 575, 576, 565

(56) References Cited

U.S. PATENT DOCUMENTS

| | | | | |
|---|---|---|---|---|
| 3,980,883 A | * | 9/1976 | Franks | 378/84 |
| 4,210,391 A | * | 7/1980 | Cohen | 351/161 |
| 4,798,446 A | * | 1/1989 | Hettrick | 359/570 |
| 5,044,706 A | | 9/1991 | Chen | 359/357 |
| 5,054,905 A | * | 10/1991 | Cohen | 351/161 |
| 5,132,843 A | * | 7/1992 | Aoyama et al. | 359/573 |
| 5,790,321 A | | 8/1998 | Goto | 359/742 |
| 5,969,864 A | | 10/1999 | Chen et al. | 359/569 |
| 5,980,454 A | | 11/1999 | Broome | 600/176 |
| 5,995,286 A | | 11/1999 | Mukai et al. | 359/571 |
| 6,157,488 A | * | 12/2000 | Ishii | 359/569 |
| 2001/0038503 A1 | * | 11/2001 | Nakai | 359/869 |

FOREIGN PATENT DOCUMENTS

| | | | | |
|---|---|---|---|---|
| EP | 0 367 878 A1 | 5/1990 | | |
| EP | 0 895 100 A2 | 2/1999 | | |
| JP | 64-76002 | 3/1989 | | |
| JP | 1-312503 | 12/1989 | | |
| JP | 4-213421 | 8/1992 | | |
| JP | 6-324262 | 11/1994 | | |
| JP | 7-113906 | 5/1995 | | |
| JP | 9-127322 | 5/1997 | | |
| JP | 10-133149 | 5/1998 | | |
| JP | 10-186120 | 7/1998 | | |
| JP | 11223717 A | * | 8/1999 | ........... G02B/05/18 |
| JP | 11-305022 | 11/1999 | | |
| JP | 2001-4818 | 1/2001 | | |

OTHER PUBLICATIONS

Yoel Arieli et al., "Design of a Diffractive Optical Element for Wide Spectral Bandwidth," 23(11) *Optical Letters* 823–24 (Jun. 1998).

Michael W. Farn et al., "Diffractive Doublet Corrected On–Axis at Two Wavelengths," 1354 *SPIE* 24–29(1990).

Carmiña Londoño et al., "The Design of Achromated Hybrid Diffractive Lens Systems," 1354 *SPIE* 30–37 (1990).

W.H. Southwell, "Binary Optics From a Ray–Tracing Point of View," 1354 *SPIE* 38–42 (1990).

Y. Yuan, "Calculation of Wave Aberration in Optical Systems with Holographic Optical Elements," 1354 *SPIE* 43–52 (1990).

* cited by examiner

*Primary Examiner*—Thong Nguyen
*Assistant Examiner*—Arnel C. Lavarias
(74) *Attorney, Agent, or Firm*—Fitzpatrick, Cella, Harper & Scinto (57) ABSTRACT

Disclosed is a diffractive optical element which includes a plurality of diffraction gratings being made of materials having different dispersions and being formed in accumulation, wherein at least one of the diffraction gratings has a varying grating thickness.

12 Claims, 6 Drawing Sheets

DIFFRACTIVE OPTICAL ELEMENT AND OPTICAL SYSTEM HAVING THE SAME

FIELD OF THE INVENTION AND RELATED ART

This invention relates to a diffractive optical element and an optical system using the same. More particularly, the invention concerns a diffractive optical element and an optical system using the same by which a high diffraction efficiency is attainable over a wide wavelength region and by which, when used in an optical system, a high and uniform diffraction efficiency is obtainable over the whole picture angle ranging from axial light to abaxial light.

One of the conventional methods for correcting chromatic aberration of an optical system is to combine lenses of different glass materials having different dispersions.

An alternative to combining lenses of different glass materials to reduce the chromatic aberration is use of a diffractive optical element in which a diffraction grating having a light diffracting function is formed on a lens sum-face or in a portion of an optical system, as discussed in "SPIE", Vol.1354, International Lens Design Conference, 1990, or disclosed in Japanese Laid-Open Patent Application, Laid-Open No. 213421/1992, Japanese Laid-Open Patent Application, Laid-Open No. 324262/1994, or U.S. Pat. No. 5,044,706, for example.

This is based on a physical phenomenon that, between a refractive surface and a diffractive surface in an optical system, chromatic aberrations with respect to light rays of a certain reference wavelength are produced in opposite directions.

Further, such a diffractive optical element can provide an effect like an aspherical surface lens, by changing the period of the periodic structure of the grating thereof. Thus, it is very effective to reduce the aberration.

Here, if comparison is made with respect to the light refracting function, while at a lens surface a single light ray is kept still as a single light ray even after being refracted, at a diffractive surface it is divided thereby into light rays of different diffraction orders.

In consideration of this, where a diffractive optical element is to be used in an optical system, it is necessary to determine the grating structure so that a light flux of a wavelength region to be used is concentrated to a predetermined order (hereinafter, this will be referred also to "design order"). Where light is concentrated to a predetermined order, the intensity of light rays of the other diffraction orders becomes small. If the intensity is zero, it means that such diffraction light does not exist.

To this end, for accomplishing the features described above, the diffraction efficiency of diffraction light at the design order must be sufficiently high. If there are light rays of diffraction orders different from the design order, such light rays are imaged at a location different from the light of the design order. Therefore, it results in unwanted light such as flare.

Thus, in an optical system having a diffractive optical element, it is very important to pay much attention to the spectral distribution of diffraction efficiency at the design order as well as the action of light rays of orders different from the design order.

Figure 8:
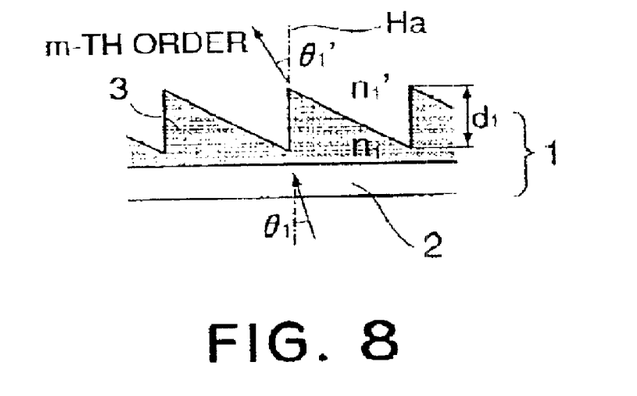
FIG. 8 is a sectional view of a conventional diffractive optical element.
Figure 9:
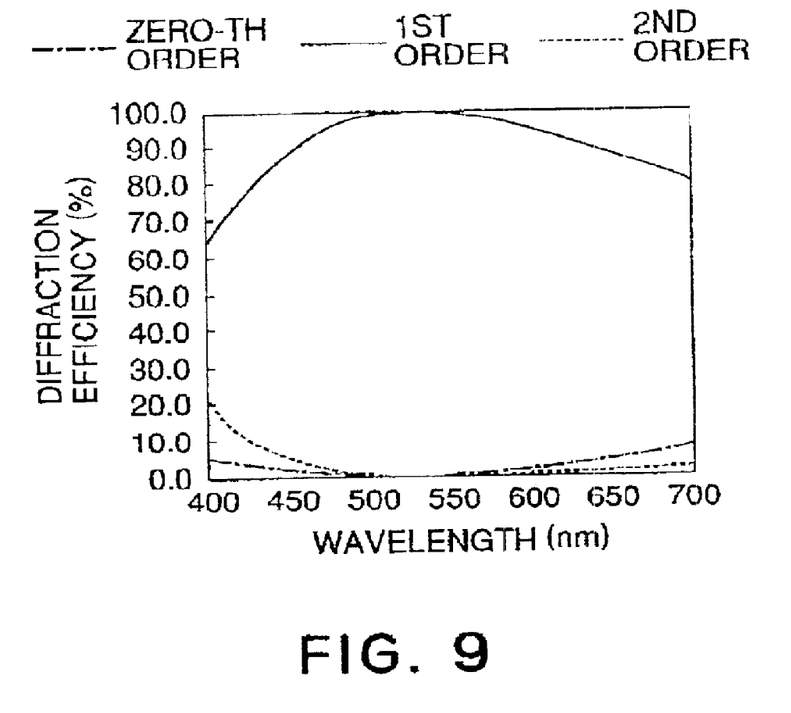
FIG. 9 is a graph for explaining the diffraction efficiency of a conventional diffractive optical element.

FIG. 8 shows a diffractive optical element 1 in which a diffraction grating 3 comprising one layer is provided on a substrate 2, is formed at a certain surface in an optical system. FIG. 9 shows diffraction efficiency curves of this diffractive optical element, with respect to particular diffraction orders.

In the following, each value of diffraction efficiencies corresponds to the proportion of the light quantity of individual diffraction light to the overall transmitted light, and it excludes reflection light at a grating interface, for example, to avoid complexity.

As regards the optical material of this diffraction grating, an ultraviolet-ray setting resin (nd=1.513, vd=51.0) was used. The grating thickness d1 was 1.03 micron. In this drawing, the axis of abscissa shows the wavelength, and the axis of ordinate denotes the diffraction efficiency.

This diffractive optical element 1 is designed so that it shows a highest diffraction efficiency with respect to a used wavelength region (about a wavelength 530 nm). The design order is first order.

Diffraction efficiencies at diffraction orders adjacent the design order (i.e. zeroth and second order lights around the first order), are also shown. It is seen from the drawing that, for the design order, the diffraction efficiency becomes highest at a certain wavelength (hereinafter, "design wavelength"). At wavelengths other than this, the efficiency decreases gradually.

In the structure described above, the design order is first order. Any decrease in the diffraction efficiency at this design order leads to diffraction light of other orders and, thus, to flare. Particularly, where plural diffraction gratings are used, a decrease in the diffraction efficiency at a wavelength other than the design wavelength causes a decrease of transmission factor.

Figure 10:
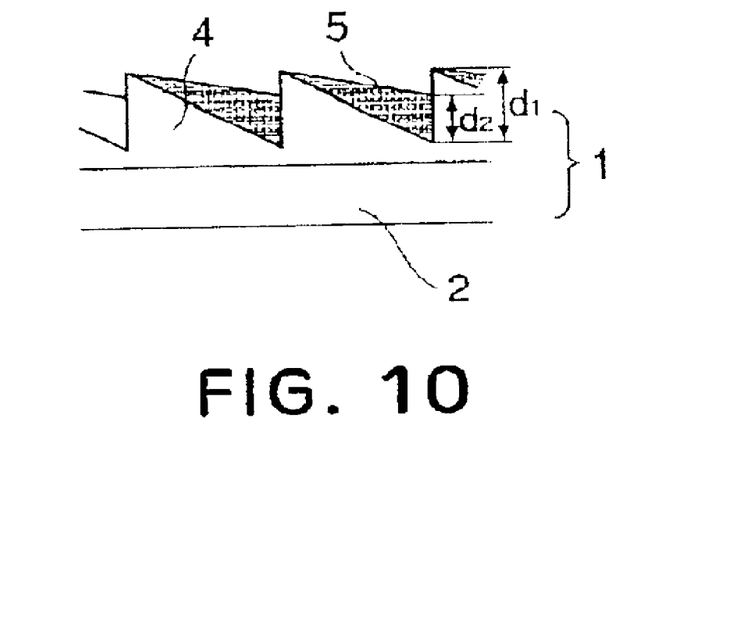
FIG. 10 is a sectional view of another conventional diffractive optical element.

The assignee of the subject application has proposed a structure by which a decrease in the diffraction efficiency can be reduced over a wide wavelength region (Japanese Laid-Open Patent Application, Laid-Open No. 133149/1998). The diffractive optical element proposed in this document comprises two diffraction gratings of accumulated sectional shape, as shown in FIG. 10, in which diffraction gratings 4 and 5 are accumulated on a substrate 2. Through optimization of the refractive index, the dispersion characteristic and the grating thickness of the materials constituting the two diffraction gratings, a high diffraction efficiency at a particular order is accomplished over a wide wavelength region.

Figure 11:
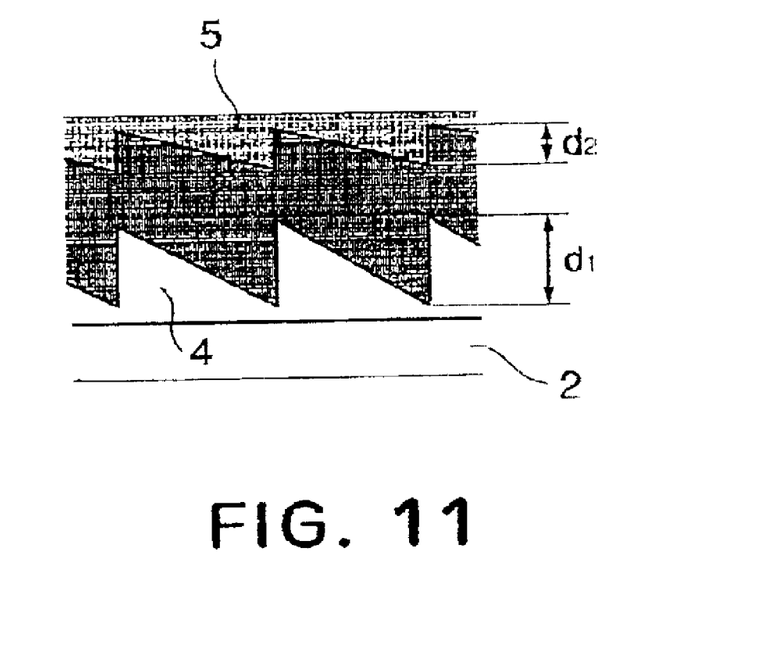
FIG. 11 is a sectional view of a further conventional diffractive optical element.

Japanese Laid-Open Patent Application, Laid-Open No. 127322/1997 shows a structure by which a decrease of diffraction efficiency can be reduced. FIG. 11 shows this structure in which the diffraction grating is made by use of three different materials and two different grating thicknesses d1 and d2 By optimization of the materials and thicknesses, a high diffraction efficiency is accomplished over the whole visible region.

In conventional diffractive optical elements such as described above, as regards the grating thickness of the diffraction grating, the documents discuss only a single condition for obtaining a largest diffraction efficiency with respect to light which is perpendicularly incident on the surface of a substrate where the diffraction grating is formed (that is, light incident with an incidence angle zero degree). The grating thickness is made constant independently of the place (position).

However, when a diffractive optical element is actually used in an optical system, for example, an image pickup optical system having a wide view angle and to be used for a silver-salt camera or a digital camera, or a wide view-angle observation optical system such an a telescope, a binocular or a microscope, the light is not always incident on the whole region of the diffraction grating with an incidence angle of zero degree, or with an angular distribution being uniformly distributed in positive and negative directions about the zero degree.

If the grating thickness is made constant as in the conventional diffractive optical element described above, when light having an incidence angle other than zero deg. or light with an incidence angle distribution being distributed about an angle other than zero deg. is incident on the grating, the diffraction efficiency there becomes low. This causes inconveniences such as a decrease of light quantity and an increase of flare.

SUMMARY OF THE INVENTION

It is an object of the present invention to provide a diffractive optical element by which a high diffraction efficiency can be accomplished even when it is used in an optical system having a wide view angle.

It is another object of the present invention to provide an optical system having such diffractive optical element.

In accordance with a first aspect of the present invention, there is provided a diffractive optical element, comprising: a plurality of diffraction gratings being made of materials having different dispersions and being formed in accumulation; wherein at least one of said plurality of diffraction gratings has a varying grating thickness. The grating thickness is a largest thickness of grating elements or grating portions.

A second aspect of the present invention may relate to the first aspect, and the grating thickness of said at least one diffraction grating may vary to gradually decrease from a central region of said diffractive optical element toward a peripheral region thereof.

A third aspect of the present invention may relate to the first aspect, and the grating thickness of said at least one diffraction grating may vary to gradually increase from a central region of said diffractive optical element toward a peripheral region thereof.

A fourth aspect of the present invention may relate to any one of the first to third aspects, and said plurality of diffraction gratings may include two diffraction gratings that are accumulated so as to be opposed to each other with an air layer being interposed between them.

In accordance with a fifth aspect of the present invention, there is provided a diffractive optical element, comprising: a plurality of diffraction gratings formed in layers of a number L+1, ranging from an α-th layer to an (α+L)-th layer in an order from the light entrance side; wherein said diffractive optical element includes a region arranged so that, where a diffraction order is an m-th order and when a particular light ray is incident on a j-th diffraction grating element, in an order from the center, in an α-th layer diffraction grating with an incidence angle θα(j), the grating thickness of each grating element of the diffraction gratings changes to satisfy the following condition, with respect to plural design wavelengths set for a common value of m, $$\sum_{i=\alpha}^{d+L}[ni\cos\theta i(j) - ni'\cos\theta i'(j)]di(j) = Km\lambda 0$$

wherein ni is the refractive index of a light entrance side material or medium of a diffraction grating in the i-th layer (α≦i≦α+L) with respect to a wavelength λ0;

ni' is the refractive index of a light exit material or medium of the i-th layer diffraction grating;

θi(j) is the incidence angle of the particular light ray on the j-th grating element in an order from the center, of the i-th layer diffraction grating;

θi'(j) is the emission angle of the particular light ray from the j-th grating element in an order from the center, of the i-th layer diffraction grating;

di(j) is the grating thickness of the j-th grating element in an order from the center, of the i-th layer diffraction grating, wherein it takes a positive value when the light exit side material or medium is present at a side where positive first order light relative to zeroth order light is produced, while it takes a negative value when the light entrance side material or medium is present there;

K is an arbitrary real number not less than 0.9 and not greater than 1.1; and

λ0 is a design wavelength.

A sixth aspect of the present invention may relate to one of the first to fifth aspects, and the particular light ray may be a light ray having an approximately average incidence angle of all light rays passing through said grating element.

A seventh aspect of the present invention may relate to one of the first to fifth aspects, and the particular light ray may be a light ray among light rays passing through said grating element, having a largest absolute value of incidence angle.

An eighth aspect of the present invention may relate to one of the first to fifth aspects, and, when said diffractive optical element is used in an optical system, the particular light ray may be a light ray which passes through said grating element and through the center of the optical system.

A ninth aspect of the present invention may relate to one of the first to eighth aspects, and at least one of said plurality of diffraction gratings may be formed on one of a flat surface and a curved surface.

A tenth aspect of the present invention may relate to one of the first to ninth aspects, and at least one of said plurality of diffraction gratings may be formed on one of a flat surface and a curved surface, wherein, in said at least one diffraction grating, the grating thickness and the thickness from the flat or curved surface to the trough of said diffraction grating may vary.

An eleventh aspect of the present invention may relate to one of the first to tenth aspects, and the design wavelength may be that of visible light.

A twelfth aspect of the present invention may relate to one of the first to eleventh aspects, and, in said plurality of diffraction gratings, the grating thickness of each diffraction grating may be not less than 2.0 microns and not greater than 30 microns.

A thirteenth aspect of the present invention may relate to one of the first to twelfth aspects, and at least one of said plurality of diffraction gratings may be formed by molding an energy setting material.

In accordance with a fourteenth aspect of the present invention, there is provided an optical system which includes at least one diffractive optical element according to one of the first to thirteenth aspects described above. This optical system may be an imaging optical system, or an observation optical system.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
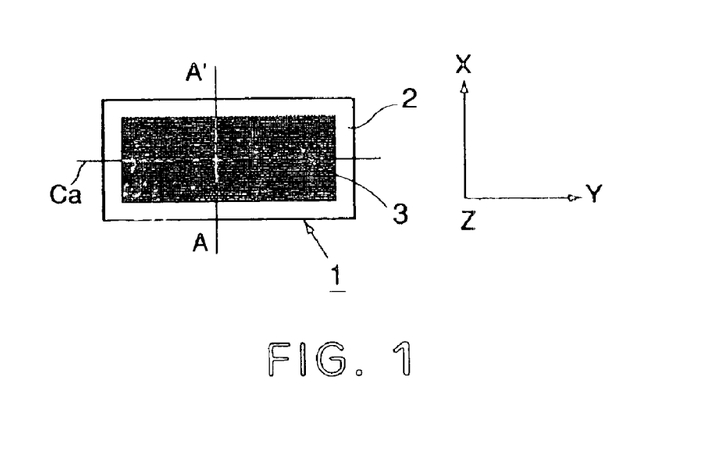
FIG. 1 is a schematic front view of a main portion of a diffractive optical element according to a first embodiment of the present invention.

FIG. 1 is a front view of a first embodiment of a diffractive optical element according to the present invention. In the drawing, a diffractive optical element 1 has a multilayered structure comprising a substrate 2 and a plurality of diffraction gratings formed in accumulation on the surface of the substrate. These diffraction gratings are made of materials having different dispersions.

Figure 2:
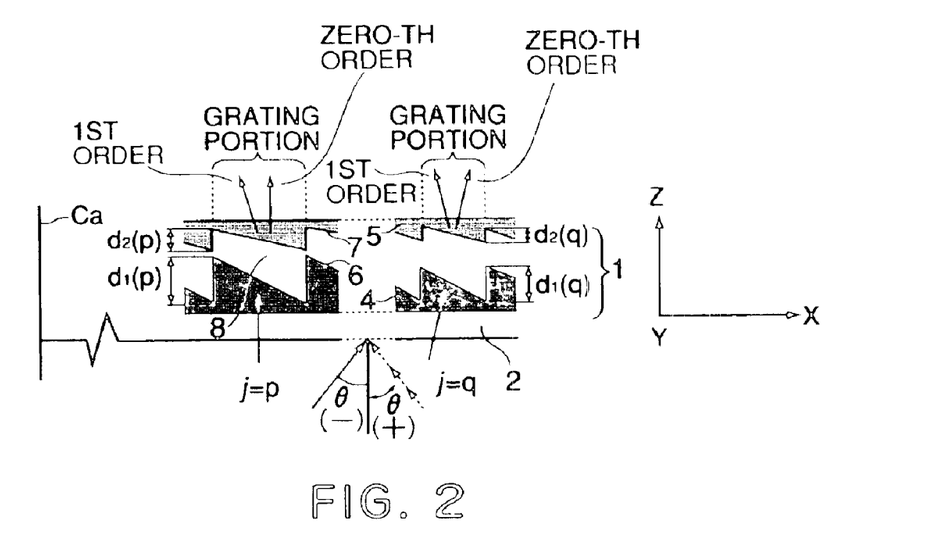
FIG. 2 is a schematic and sectional view of a main portion of the diffractive optical element according to the first embodiment.

FIG. 2 shows the sectional shape of the diffractive optical element 1 of FIG. 1, taken along a line A–A' in FIG. 1. For better understanding, the illustration in FIG. 2 is being enlarged in the thickness direction of the diffraction grating.

Regarding the shape of the diffraction gratings of this embodiment, a first layer diffraction grating 4 and a second layer diffraction grating 5 are accumulated on the substrate 2, to be opposed to each other with an air layer 8 interposed between them. Grating elements of these diffraction gratings are arrayed along a one-dimensional direction (X direction). At an interface between the first layer diffraction grating 4 and the air layer 8, a first diffraction grating surface 6 is defined. At an interface between the air layer 8 and the second layer diffraction grating 5, a second diffraction grating surface 7 is defined. Here, in these grating surfaces, the grating thickness d varies with the position along the surface (X direction) so that a largest diffraction efficiency can be accomplished with a particular light ray or rays of a design wavelength, impinging on the grating elements. FIG. 2 shows a case where the grating thickness d1 (p) of the first layer at the p-th grating element in an order from the center as well as the grating thickness d2 (p) of the second layer thereof, and the grating thickness d1 (q) of the first layer at the q-th grating element in an order from the center as well as the grating thickness d2(q) of the second layer thereof are made different from each other. Specifically, there are relations d1(p)>d1(q) and d2(p)>d2(q).

Here, the center Ca is a middle point in the distance of the diffractive optical element 1 in X direction (direction of array of the grating elements) The central axis extends through this middle point and perpendicularly to the surface of the substrate 2.

In the present invention, along the grating surface, the grating thickness is optimized in accordance with the position on the surface of each grating element. This assures that, when the diffractive optical element is incorporated in an optical system, the diffraction efficiency can be uniform over the whole view angle range and, thus unwanted flare can be avoided satisfactorily. Therefore, a high diffraction efficiency is obtainable.

In this embodiment, the pitch of the diffraction grating in one-dimensional direction is fixed or, alternatively, it is changed at a certain proportion. The grating thickness is changed in accordance with the position, in one-dimensional direction (X direction).

Next, the incidence angle dependency of the diffraction efficiency of a diffraction grating, for determination of an optimum grating thickness of each diffraction grating element, will be explained.

In a diffractive optical element 1 having an ordinary diffraction grating such as shown in the sectional view of FIG. 8, the condition for attaining a largest diffraction efficiency with a design wavelength $\lambda 0$ is that the optical path difference produced in the light (wavelength $\lambda 0$) at the surface step portion of the diffraction grating (element) 3 is equal to a multiple of the wavelength by an integer. Generally, it is expressed as follows:

$$(n1-n1')d1=m\lambda 0 (m \neq 0) \quad (1)$$

where n1 and n1' are refractive indices of the light entrance side material or medium and the light exit side material or medium, respectively, of the diffraction grating surface with respect to the wavelength $\lambda 0$, d1 is the grating thickness, and m is the diffraction order (other than zeroth order). The above equation is a condition for a case where the incidence angle of incident light and the emission angle of m-th order diffraction light are both equal to zero deg. or they can be approximated as zero deg.

If, however, the emission angle of the m-th order diffraction light is large as can not be approximated as zero degree, the largest diffraction efficiency is not attainable with the condition of equation (1) above. It is necessary to use an equation in which the emission angle is taken into consideration. Namely, the condition with which a largest diffraction efficiency is attainable is:

$$(n1-n1' \cos \theta 1')d1=m\lambda 0 \quad (2)$$

where $\theta 1'$ is the emission angle of the m-th order diffraction light from the grating 3. However, $\theta 1'$ is an angle in the emission direction of the diffraction light, with respect to a normal Ha to the surface where the grating is formed. It is not an angle with respect to the diffraction grating surface such as a microscopically observed blazed shape, for example. This is also the case with the terms of incidence angle and emission angle to be referred to below.

In ordinary diffractive optical elements, particularly, when a diffractive optical element is used in a portion of a photo-taking optical system or an observation optical system, it is not assured that, at every grating placed in different positions, the light rays are incident with zero degree or an angle that can be approximated as zero degree. The condition for assuring a largest diffraction efficiency with a light ray of a wavelength $\lambda 0$, being incident on a grating with an incidence angle $\theta 1$ is given by:

$$(n1 \cos \theta 1 - n1' \cos \theta 1')d1 = m\lambda 0 \quad (3)$$

In cases of accumulation type diffractive optical elements having two or more layers of diffraction gratings being accumulated, the concept for the condition of attaining a largest diffraction efficiency while taking into account the incidence angle and the emission angle of light is essentially the same. More specifically, the condition for attaining a largest diffraction efficiency with respect to a light ray of a wavelength $\lambda 0$, being incident with an incidence angle $\theta 1$, where m-th diffraction order is produced by the diffraction grating having accumulated layers of a number n, is as follows:

$$\sum_{i=1}^{n} [ni\cos\theta i - ni'\cos\theta i']di = Km\lambda 0 \quad (4)$$

where n1 and n1' are refractive indices of light entrance side material or medium and the light exit side material or medium, respectively, of the i-th layer diffraction grating, in an order from the light entrance side, with respect to the wavelength $\lambda 0$. Also, $\theta 1$ and $\theta 1'$ are the incidence angle and the emission angle of the light on and from the i-th layer diffraction grating in an order from the light incidence side.

It is to be noted here that, although di is the grating thickness as measured along a normal to the surface where the i-th layer diffraction grating is formed, it takes a positive value when the light exit side material or medium is present at a side where positive first order light relative to zeroth order light is produced, whereas it takes a negative value when the light entrance side material or medium is present there.

In the present invention, a particular note has been paid to the incidence angle distribution of light rays of a design wavelength $\lambda 0$ being incident on a j-th grating (element) of an i-th layer diffraction grating, in an order from the central axis Ca, an optimum grating thickness is calculated in accordance with equation (4), on the basis of the incidence angle of a particular light ray that corresponds to an average, a gravity center value, a maximum value or the like.

In this embodiment, as described above, plural diffraction gratings made of different materials are accumulated as layers. Equation (4) is satisfied in regard to the same value of m (for example, m=1), with respect to at least two wavelengths, so as to assure that the diffraction efficiency in the particular order (design order) is made high throughout the whole used wavelength region (visible region). Also, at least one of the plural diffraction grating, the grating thickness is varied.

With this arrangement, like dechromatization in an ordinary dioptric system, plural materials having different dispersions are used in combination such that the wavelength dependency of the diffraction efficiency is reduced and a high diffraction efficiency is accomplished throughout the whole used wavelength region. Further, since the angular distributions of light rays incident on different positions on the surface, where the diffraction grating is formed, are taken into consideration and the grating thicknesses of individual grating elements are determined to assure a largest diffraction efficiency at respective grating elements, the diffraction efficiency can be kept uniform and high, from the center to the periphery of the view angle. Also, flare can be avoided.

At least one diffraction grating, among the layered diffraction gratings, includes a region in which the grating thickness changes to gradually decrease or gradually increase, from the central portion toward the peripheral portion thereof.

Advantageous effects of the present invention will be described with reference to particular examples.

As a diffractive optical element of layered type of the present invention, here, a case having two layers of diffraction gratings each being such as shown in FIG. 2 will be considered. As an example of material, in this case, the first layer diffraction grating 4 is made of an ultraviolet-ray setting resin 1 (nd=1.513, vd=51.0) which is one of energy setting materials, while the second layer diffraction grating 5 is made of an ultraviolet-ray setting resin 2 (nd=1.636, vd=22.8), also being an energy setting resin. In this embodiment, the grating thickness of each grating element is determined to be not less than 2.0 microns and not greater than 30 microns.

The first layer diffraction grating 4 may be made of a thermosetting resin, as an energy setting resin.

In a diffraction grating wherein a particular light ray is incident thereon at an incidence angle of zero deg., if the design wavelength $\lambda 0$ is 590 nm and the design diffraction order is first order, the grating thickness that gives a largest diffraction efficiency is, in the equation not considering the incidence angle and the emission angle, that is, in equation (4), determined by replacing $\theta i$ and $\theta i'$ by 0 (zero). As an example, the grating thickness of the first layer diffraction grating 4 may be 9.13 microns, and the grating thickness of the second layer diffraction grating 5 may be 6.43 microns.

Table 1 below is a comparative example and it shows diffraction efficiencies of diffraction lights of first order (design order), zeroth order and second order, with respect to light rays of a wavelength 590 nm, being incident at incidence angles of −20 deg., −15 deg., −10 deg., 0 deg., 5 deg., 10 deg., 15 deg., and 20 deg., respectively, upon a diffraction grating formed with the same grating thickness combination determined above and having a grating pitch of 1 mm. Here, as regards the incidence angle, in the case of FIG. 2, the angle of incidence from the left is negative, while the angle of incidence from the right is positive.

TABLE 1

WAVELENGTH DEPENDENCY OF DIFFRACTION EFFICIENCY (Grating Pitch: 1 mm)

| INCIDENCE ANGLE | GRATING THICKNESS (micron) | | DIFFRACTION EFFICIENCY η (%) | | |
|---|---|---|---|---|---|
| (deg) | 1st Layer | 2nd Layer | 1st Order | 0th Order | 2nd Order |
| −20 | | | 93.05651 | 1.53511 | 2.77984 |
| −15 | | | 98.15766 | 0.47911 | 0.64738 |
| −10 | | | 99.70429 | 0.08458 | 0.09536 |
| −5 | | | 99.98768 | 0.00370 | 0.00379 |
| 0 | 9.13 | 6.43 | 99.99986 | 0.00004 | 0.00004 |
| 5 | | | 99.94526 | 0.01621 | 0.01707 |
| 10 | | | 99.36153 | 0.17734 | 0.21158 |
| 15 | | | 96.89299 | 0.76891 | 1.13843 |
| 20 | | | 89.68200 | 2.10545 | 4.37704 |

In Table 1, the diffraction efficiency $\eta(\lambda 0)$ is a value which can be calculated from the following equation:

$$\eta(\lambda 0) = \sin c^2[\pi\{M - \Phi(\lambda 0)/\lambda 0\}] \quad (5)$$

where M is a desired diffraction order for calculation of the efficiency, and $\Phi(\lambda 0)$ is given by:

$$\Phi(\lambda 0) = \sum_{i=1}^{n} (ni\cos\theta i - ni'\cos\theta i')di \quad (6)$$

In the present invention, it is set as:

$$\Phi(\lambda 0) = (n1\cos\theta 1 - n1'\cos\theta 1')d1 + (n2\cos\theta 2 - n2'\cos\theta 2')d2$$

where n1 is the refractive index of the light entrance side material or medium of the first layer diffraction grating 4 with respect to a wavelength λ0, n1' is the refractive index of the light exit side material or medium of the first layer diffraction grating 4 with respect to a wavelength λ0, n2 is the refractive index of the light entrance side material or medium of the second layer diffraction grating 5 with respect to a wavelength λ0, n2' is the refractive index of the light exit side material or medium of the second layer diffraction grating 5 with respect to a wavelength λ0, θ1 is the incidence angle upon the first layer diffraction grating 4, θ1' is the emission angle from the first layer diffraction grating 4, θ2 is the incidence angle upon the second layer diffraction grating 5, θ2' is the emission angle from the second layer diffraction grating 5, d1 is the grating thickness of the first layer diffraction grating 4, d2 is the grating thickness of the second layer diffraction grating 5. As regards the grating thickness, it takes a positive value when, in the side wall portion of the grating, the light exit side material is present at a side where positive first order light relative to zeroth order light is produced, while it takes a negative value when the light entrance side material is present there. In FIG. 2, in the first layer, there is a light exit side medium (air, in this example) at the side where positive first order diffraction light appears, and it takes a positive value (9.13 microns). In the second layer, there is a light exit side medium (ultraviolet-ray setting resin, in this example) at the side where positive first order diffraction light relative to the zeroth order light appears, and it takes a positive value (6.43 microns).

Also, it is seen from the equation that, in regard to the diffraction efficiencies shown in Table 1, reflection of light at the interfaces or eclipse of light by the diffraction gratings are not taken into account.

It is seen from Table 1 that, in a diffraction grating having grating elements with the same grating thickness, the diffraction efficiency of the first order diffraction light (design order) decreases with an increase in an absolute value of the incidence angle, while the diffraction efficiencies of zeroth order and second order diffraction lights, other than the design order, become larger. These diffraction lights other than the design order lead to flare light (noise light), and it is desired to improve or reduce them.

In consideration of this, according to the present invention, the grating thickness of each grating element is varied to satisfy equation (4) to assure a largest diffraction efficiency, in accordance with the incidence angle of light incident on the grating element. Table 2 shows diffraction efficiencies with varying grating thicknesses in this example.

TABLE 2

DIFFRACTION EFFICIENCY WITH GRATING THICKNESS CORRESPONDING TO INCIDENCE ANGLE (Grating Pitch: 1 mm)

| INCIDENCE ANGLE | GRATING THICKNESS (micron) | | DIFFRACTION EFFICIENCY η (%) | | |
|---|---|---|---|---|---|
| (deg) | 1st Layer | 2nd Layer | 1st Order | 0th Order | 2nd Order |
| −20 | 8.32 | 5.90 | 99.99869 | 0.0004 | 0.00040 |
| −15 | 8.69 | 6.14 | 99.99957 | 0.00013 | 0.00013 |
| −10 | 8.94 | 6.31 | 99.99982 | 0.00006 | 0.00006 |
| −5 | 9.09 | 6.40 | 99.99988 | 0.00004 | 0.00004 |
| 0 | 9.13 | 6.43 | 99.99988 | 0.00004 | 0.00004 |
| 5 | 9.07 | 6.39 | 99.99989 | 0.00003 | 0.00003 |
| 10 | 8.90 | 6.28 | 99.99995 | 0.00002 | 0.00002 |
| 15 | 8.62 | 6.10 | 100.00000 | 0.00000 | 0.00000 |
| 20 | 8.23 | 5.85 | 99.99965 | 0.00011 | 0.00011 |

The grating thicknesses are example of values where the grating thickness d is changed to satisfy equation (4).

It is seen from Table 2 that, by assigning an optimum grating thickness in accordance with the incidence angle, a very high diffraction efficiency is assured with respect to every incidence angles, and that the efficiency is clearly improved as compared with the conventional structure shown in Table 1, which is an example where the grating thickness is optimized with an incidence angle and an emission angle, both being equal to zero deg.

However, when a diffractive optical element is actually used in an optical system, light rays having a certain incidence angular distribution may be incident on a grating element (diffraction grating) which is at a certain distance from the optical axis canter of the optical system.

In consideration of this, in order to accomplish an optimum diffraction efficiency throughout the whole view angle, while taking into account the incidence angle distribution of light rays incident on regions (grating elements) of the diffractive optical element, those grating thicknesses optimized with respect to the incidence angle of a light ray corresponding to an average, a gravity center value or a largest absolute value, for example, which can be determined from the incidence angle distribution of all light rays passing through the grating elements, or the incidence angle of a light ray which passes through the center of a stop of an optical system having the diffractive optical element incorporated thereinto, are applied to the grating elements.

In this embodiment, the grating thickness is not less than 2.0 microns and not greater than 30 microns. Satisfactory diffraction efficiencies are provided by this. The grating thickness may be changed in a range from zero to 1.2 microns in accordance with the view angle, and this is preferable in respect to the optical performance.

Also, it is seen from Table 1 that the decrease of diffraction efficiency in a layered type diffractive optical element, comprising diffraction gratings of blazed shape such as shown in FIG. 2, is larger as the incidence angle shifts positively than when it shifts negatively. This means that there are cases wherein the optimization of the grating thickness may preferably be done not with respect to the incidence angle of a particular light ray having the incidence angle corresponding to an average determined from the incidence angle distribution, or to the incidence angle of a central light ray of the stop of the optical system having the diffractive optical element, but rather with respect to the incidence angle of a light ray having an incidence angle slightly shifted positively.

In this embodiments one-dimensional diffraction gratings 4 and 5 are formed on a flat surface of the substrate 2. However, substantially the same advantageous results are obtainable with a case where they are formed on a curved surface of a curved substrate.

It is to be noted here that, where diffraction gratings are formed on a curved surface as described above, the grating thickness thereof should be defined as being measured along a normal to that surface.

Figure 3:
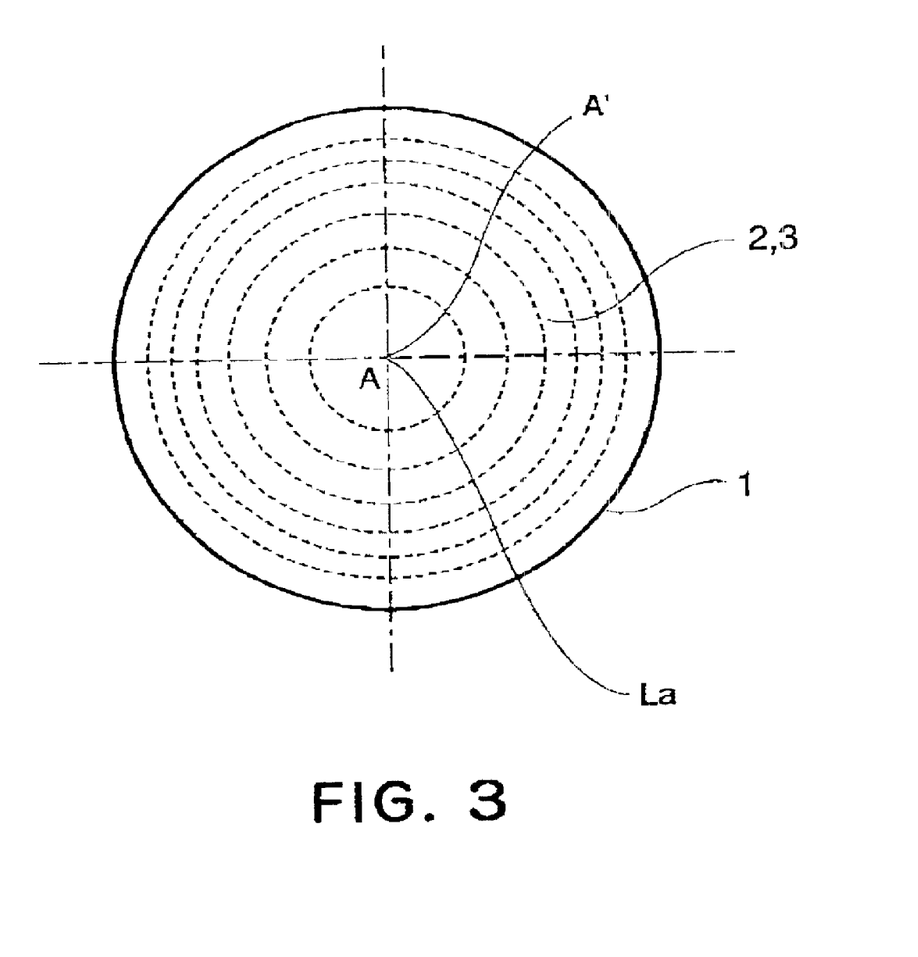
FIG. 3 is a schematic plan view of a diffractive optical element according to the present invention.

Further, in this embodiment, as shown in FIG. 1, diffraction grating elements are formed straight on the substrate. However, grating elements may be formed concentrically as shown in FIG. 3 to provide a diffraction lens having a lens function, wherein the grating pitch gradually decreases from the center to the periphery. Substantially the same advantageous effects are attainable with this structure.

The diffractive optical element 1 shown in FIG. 2 is a second embodiment of the present invention, and it comprises a plurality of diffraction gratings 3 having a grating pitch gradually decreasing from the center (optical axis) La to the periphery, wherein these diffraction gratings are accumulated on a substrate 2.

Also in this example, the grating thickness of each diffraction grating 3 is varied from the center La to the periphery.

Figure 4:
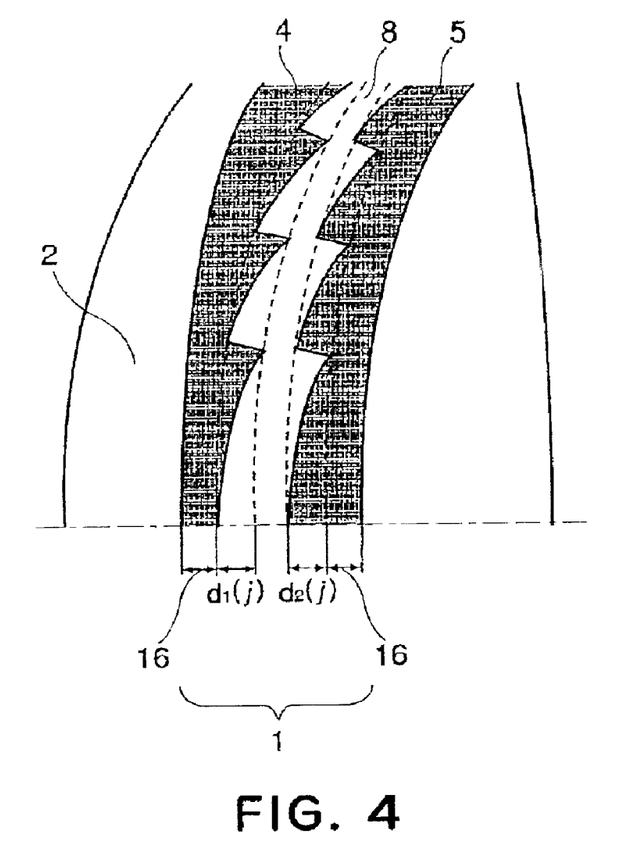
FIG. 4 is a schematic and sectional view of a main portion of a diffractive optical element according to a second embodiment of the present invention.

FIG. 4 is a sectional view of a main portion of the second embodiment of the present invention, taken along a line A—A in FIG. 3. In the first embodiment of the present invention shown in FIG. 2, only the grating thickness is varied along a predetermined direction (X direction). As compared, in the second embodiment of the present invention shown in FIG. 4, not only the grating thicknesses d1(j) and d2(j) are varied along the center to the periphery, but also the thickness 16 (grating base thickness) from the surface where the diffraction grating is forced to the trough of the grating is varied. In a diffractive optical element, an effect equivalent to an aspherical lens can be easily obtained by changing the grating pitch. However, even by changing the grating base thickness, an aspherical lens effect is obtainable easily. In this embodiment, the grating base thickness gradually increases from the center toward the periphery.

When the diffractive optical element 1 of the second embodiment is used in an optical system, a large diffraction efficiency is obtainable with respect to light rays of a wide wavelength region.

Figure 5:
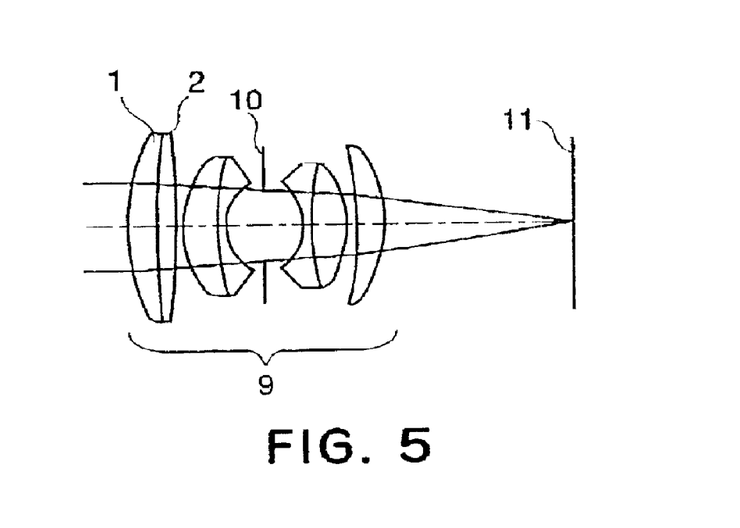
FIG. 5 is a schematic view of a photo-taking optical system according to a third embodiment, which uses a diffractive optical element of the present invention.

FIG. 5 shows a third embodiment of an optical system using a diffractive optical element according to the present invention. Specifically, FIG. 5 is a sectional view of a photo-taking optical system such as a camera, for example. In FIG. 5, denoted at 9 is a photo-taking lens in which a diffractive optical element 1 according to the present invention is provided on a substrate 2 which is a lens. Denoted at 10 is a stop, and denoted at 11 is a film corresponding to an imaging plane, or a solid image pickup element such as a CCD.

Figure 6:
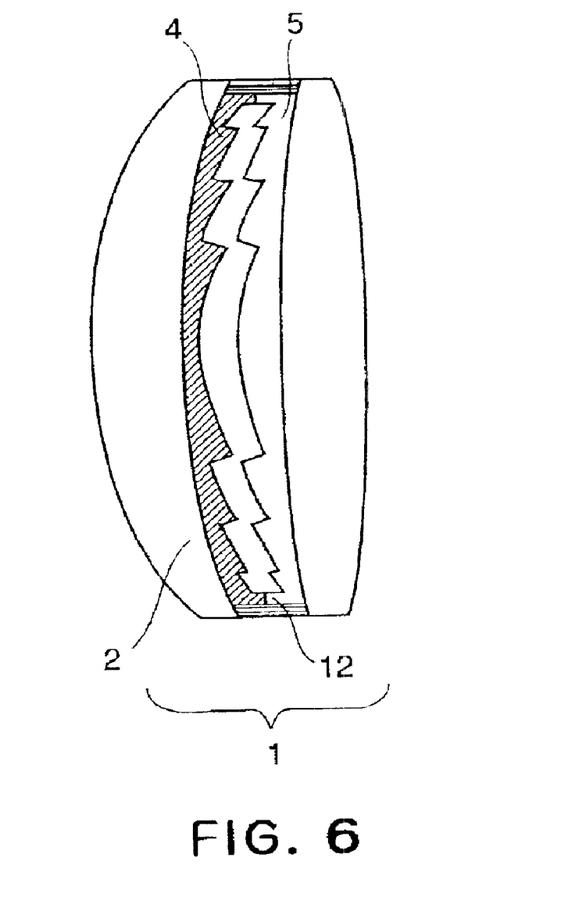
FIG. 6 is a schematic and sectional view of a main portion of a diffractive optical element according to a third embodiment of the present invention.

The diffractive optical element has a layered structure comprising plural diffraction gratings which are made of materials having different dispersions. With this structure, the wavelength dependency of the diffraction efficiency is improved notably. Also, grating thicknesses being optimized on the basis of the incidence angle distribution corresponding to the position on the grating surface are given. As a result of this, the diffraction efficiency is much improved not only with respect to axial light but also with respect to abaxial light. Thus, a high quality photo-taking lens with less flare light and having a high resolution over the whole view angle, is accomplished. Further, the diffractive optical element 1 of the present invention can be fabricated by a simple method that, as shown in FIG. 6, after the diffraction gratings 4 and 5 are produced, they are cemented to each other at the peripheral portion 12 thereof. Therefore, an inexpensive lens being suited for mass-production is provided as a photo-taking lens.

Although this embodiment concerns a photo-taking lens of a camera, this is just an example Substantially the same advantageous effects are obtainable when the invention is applied to a photo-taking lens of a video camera, for example.

Figure 7:
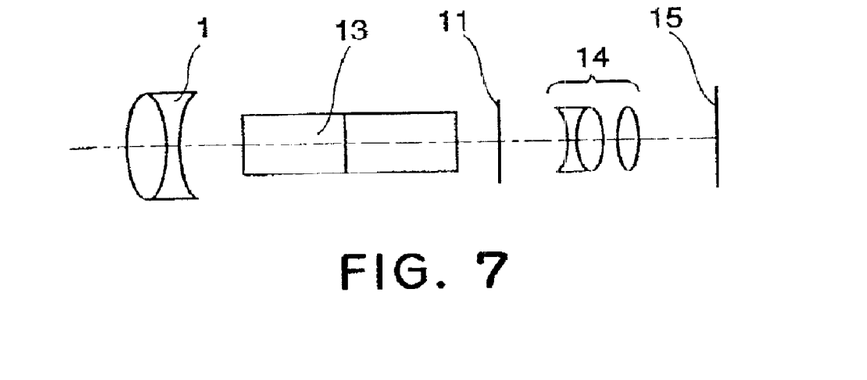
FIG. 7 is a schematic view of a fourth embodiment which uses a diffractive optical element according to the present invention.

FIG. 7 is a schematic view of a main portion of an optical system with a diffractive optical element, according to a fourth embodiment of the present invention. Specifically, FIG. 7 shows a section of an observation optical system for a binocular, for example. In the drawing, denoted at 13 is a prism (image inversion means) for inversing an image, and denoted at 14 is an eyepiece lens. Denoted at 15 is an evaluation plane (pupil plane). Denoted at 1 is a diffractive optical element of the present invention. The diffractive optical element 1 is provided to correct chromatic aberration, at the imaging plane 11, of the whole optical system, for The diffractive optical element has a layered structure comprising plural diffraction gratings which are made of materials a having different dispersions. With this structure, the wavelength dependency of the diffraction efficiency is improved notably. Also, grating thicknesses being optimized an the basis of the incidence angle distribution corresponding to the position on the grating surface are given. As a result of this, the diffraction efficiency is much improved not only with respect to axial light but also with respect to abaxial light. Thus, a high quality photo-taking lens with less flare light and having a high resolution over the whole view angle, is accomplished. Further, the diffractive optical element of the present invention can be fabricated by a simple method and, therefore, an inexpensive optical system being suited for mass-production is provided as an observation optical system.

In this embodiment, the diffractive optical element 1 is provided at the objective lens side in the observation optical system. However, this is just an example. It may be provided on the surface of the prism surface or at the position of the eyepiece lens 14. When it is provided on object side of the imaging plane, the chromatic aberration reducing effect is produced only at the object lens side. Therefore, in a case of a naked-eye observation optical system, preferably at least one diffractive optical element is provided on the objective lens side.

Further, although this embodiment concerns a binocular, this is just an example. It may be applied to a telescope, an astronomical telescope, or a microscope. Moreover, substantially the same advantageous effects are obtainable in cases of optical type finder such as a video camera or a lens shutter camera.

In the present invention, as described above, a diffractive optical element is used in a portion of an optical system and, in order to assure a largest light utilization efficiency in the whole optical system, the incidence angle distribution of all light rays passing through the grating elements at different positions on the diffractive optical element are taken into consideration, and the grating thickness of each diffraction grating is changed to optimum values corresponding to the positions on the surface. Largest diffraction efficiencies are attained thereby at respective grating elements, Particularly, the diffractive optical element of this embodiment comprises plural diffracting gratings having different dispersions which are accumulated in layers. This enables enlarging the diffraction efficiency of light at a particular order (design order) and throughout the whole used wavelength region. Where such diffractive optical element is to be used in an optical system, optimum grating thicknesses of the grating elements are determined while the incidence angle distribution of all light rays incident on grating elements at positions from the optical axis center to the periphery is taken into account. With this arrangement, uniform and large diffraction efficiencies are accomplished from the center to the periphery of the view angle. Thus, an optical system with a diffractive optical element by which flare can be reduced, is provided.

In accordance with the present invention as described above, a diffractive optical element which attains a large diffraction efficiency over a wide view angle even used in a wide view angle optical system, is accomplished.

While the invention has been described with reference to the structures disclosed herein, it is not confined to the details set forth and this application is intended to cover such modifications or changes as may come within the purposes of the improvements or the scope of the following claims.

What is claimed is:

1. A diffractive optical element, comprising:
    a plurality of laminated diffraction gratings comprising two diffraction gratings made of materials having different dispersions; and
    a substrate having at least one of the plurality of gratings formed on its top surface,
    wherein light incident on the optical element is influenced by diffracting action as it passes through the plurality of diffraction gratings and the substrate,
    wherein at least one of said plurality of diffraction gratings has a varying maximum grating thickness, which varies in accordance with a position along said at least one diffraction grating, and
    wherein at least one of said plurality of diffraction gratings has a varying thickness from the top face of the substrate to individual troughs of said at least one diffraction grating, which varies in accordance with a position along said at least one diffraction grating, thereby providing an aspheric action.

2. A diffractive optical element according to claim 1, wherein the maximum grating thickness of said at least one diffraction grating varies to gradually decrease from a central region of said diffractive optical element toward a peripheral region thereof.

3. A diffractive optical element according to claim 1, wherein the maximum grating thickness of said at least one diffraction grating varies to gradually increase from a central region of said diffractive optical element toward a peripheral region thereof.

4. A diffractive optical element according to claim 1, wherein said plurality of diffraction gratings include two diffraction gratings which are laminated so as to be opposed to each other with an air layer being interposed therebetween.

5. A diffractive optical element according to claim 1 comprising:
    a plurality of diffraction gratings formed in layers of a number L+1, ranging from an α-th layer to an (α+L)-th layer in an order from the light entrance side;
    wherein said diffractive optical element includes a region arranged so that, where a diffraction order is an m-th order and when a particular light ray is incident on a j-th diffraction grating element, in an order from the center, in an α-th layer diffraction grating with an incidence angle θα(j), the grating thickness of each grating element of the diffraction gratings changes to satisfy the following condition, with respect to plural design wavelengths set for a common value of m, $$\sum_{i=\alpha}^{\alpha+L} [ni\cos\theta i(j) - ni'\cos\theta i'(j)]di(j) = Km\lambda 0$$

wherein
    ni is the refractive index of a light entrance side medium of a diffraction grating in the i-th layer ($\alpha \leq i \leq \alpha+L$) with respect to a wavelength λ0;
    ni' is the refractive index of a light exit side medium of the i-th layer diffraction grating;
    θi(j) is the incidence angle of the particular light ray on the j-th grating element in an order from the center, of the i-th layer diffraction grating;
    θi'(j) is the emission angle of the particular light ray from the j-th grating element in an order from the center, of the i-th layer diffraction grating;
    di(j) is the maximum grating thickness of the j-th grating element in an order from the center, of the i-th layer diffraction grating, wherein it takes a positive value when the light exit side medium is present at a side where positive first order light relative to zeroth order light is produced, while it takes a negative value when the light entrance side medium is present there;
    K is an arbitrary real number not less than 0.9 and not greater than 1.1; and
    λ0 is a design wavelength.

6. A diffractive optical element according to claim 5, wherein the design wavelength is that of visible light.

7. A diffractive optical element according to claim 5, wherein, in said plurality of diffraction gratings, the maximum grating thickness of each diffraction grating is not less than 2.0 microns and not greater than 30 microns.

8. A diffractive optical element according to claim 5, wherein at least one of said plurality of diffraction gratings is formed by molding an energy setting material.

9. A diffractive optical element according to claim 1, wherein the top surface is flat or curved.

10. A diffractive optical element according to claim 1, wherein, in said plurality of diffraction gratings, the maximum grating thickness of each diffraction grating is not less than 2.0 microns and not greater than 30 microns.

11. A diffractive optical element according to claim 1, wherein at least one of said plurality of diffraction gratings is formed by molding an energy setting material.

12. An optical system including at least one diffractive optical element as recited in claim 1.

* * * * *

UNITED STATES PATENT AND TRADEMARK OFFICE
CERTIFICATE OF CORRECTION

PATENT NO. : 6,937,397 B2
DATED : August 30, 2005
INVENTOR(S) : Takeharu Okuno et al.

It is certified that error appears in the above-identified patent and that said Letters Patent is hereby corrected as shown below:

Title page,
Item [56], References Cited, FOREIGN PATENT DOCUMENTS,
"11223717 A" should read -- 11-223717 A --.

Column 1,
Line 23, "sum-face" should read -- surface --.

Column 2,
Line 67, "an" should read -- as --.

Column 10,
Line 4, "angles," should read -- angle, --; and
Line 13, "canter" should read -- center --.

Column 11,
Line 52, "example" should read -- example. --; and
Line 67, "for" should read -- for example. --.

Column 12,
Line 6, "an" should read -- on --.

Column 13,
Line 31, "include" should read -- includes --.

Signed and Sealed this

Fourteenth Day of February, 2006

JON W. DUDAS
*Director of the United States Patent and Trademark Office*